(12) United States Patent
Cho et al.

(10) Patent No.: US 8,832,393 B2
(45) Date of Patent: Sep. 9, 2014

(54) ALIGNMENT FOR MULTIPLE FIFO POINTERS

(75) Inventors: Jung Ho Cho, Allentown, PA (US); Vladimir Sindalovsky, Perkasie, PA (US); Lane A. Smith, Easton, PA (US)

(73) Assignee: LSI Corporation, Milpitas, CA (US)

( * ) Notice: Subject to any disclaimer, the term of this patent is extended or adjusted under 35 U.S.C. 154(b) by 344 days.

(21) Appl. No.: 13/449,684

(22) Filed: Apr. 18, 2012

(65) Prior Publication Data

US 2013/0282995 A1    Oct. 24, 2013

(51) Int. Cl.
*G06F 12/02* (2006.01)
*G06F 1/12* (2006.01)

(52) U.S. Cl.
CPC ........................... *G06F 1/12* (2013.01)
USPC .............................. 711/159; 711/109; 711/110

(58) Field of Classification Search
CPC ................ G06F 1/10; G06F 1/11; G06F 1/12
USPC .......................................................... 711/159
See application file for complete search history.

(56) References Cited

U.S. PATENT DOCUMENTS

| | | | |
|---|---|---|---|
| 4,374,428 A | 2/1983 | Barnes | |
| 6,134,155 A | 10/2000 | Wen | |
| 6,269,413 B1 | 7/2001 | Sherlock | |
| 6,907,479 B2 | 6/2005 | Karnstedt et al. | |
| 6,934,198 B1* | 8/2005 | Lowe et al. | 365/189.07 |
| 7,093,061 B2 | 8/2006 | Teo | |
| 7,352,836 B1* | 4/2008 | Mendenhall | 375/372 |
| 7,752,506 B1 | 7/2010 | Yadav | |
| 2005/0122815 A1* | 6/2005 | Momtaz et al. | 365/221 |
| 2005/0188146 A1* | 8/2005 | Teo | 711/5 |
| 2006/0273941 A1* | 12/2006 | Charath et al. | 341/100 |

\* cited by examiner

*Primary Examiner* — April Y Blair
*Assistant Examiner* — Kenneth Tsang

(57) ABSTRACT

In described embodiments, a multiple first-in, first-out buffer pointers (multi-FIFO pointers) alignment system includes synchronization circuitry to align multiple FIFO buffer operations. A FIFO read clock stoppage signal is generated by master logic that stops the read clock shared by all the transmit channels and then re-starts the read clock to align them. The FIFO read clock stoppage signal is applied to the read clock of all FIFOs which need to be aligned and, when rate change is needed, the FIFO read clock stoppage signal suspends the read clock, causing local write and read pointers to be reset. After the FIFO read clock stoppage signal is de-asserted, the read clock starts to all FIFOs concurrently, thereby aligning the channels.

14 Claims, 4 Drawing Sheets

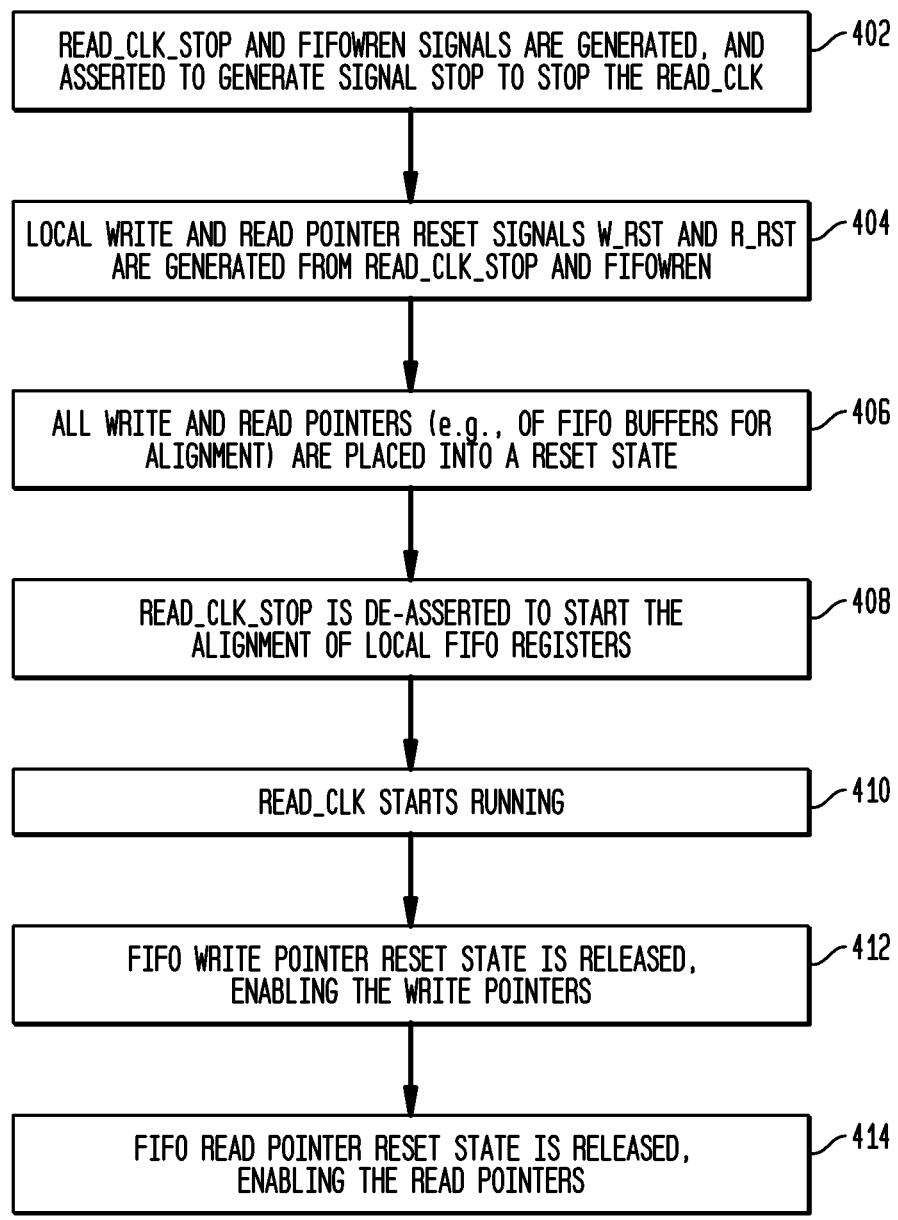

US 8,832,393 B2

ALIGNMENT FOR MULTIPLE FIFO POINTERS

BACKGROUND OF THE INVENTION

Many complex electrical systems commonly employ multiple buffers for processing, usually first-in, first-out (FIFO) buffers, to store data transferred between operations especially when transferring data between synchronous but not synphase clock domains. When operating in accordance with a standard, such as a serializer-deserializer (SerDes) standard, such FIFOs might be required to provide information under very precisely timed read and write operations. However, due to variations in processing, circuit layout, and other considerations alignment of pointers presents a design challenge, especially at high speed operation. This limits FIFO buffer usage in designs where multiple FIFOs need to be aligned for specific standard requirements. Normally, FIFO pointer resets are synchronized to the write/read clock domain, which synchronization introduces uncertainty to the pointer alignment between different FIFO buffers. Known existing solutions daisy chain the FIFO control signals (in master-slave configuration) to align pointers. However, performance of these techniques degrades in high speed applications.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allows for aligning data write and read operations between different buffers. A master logic circuit, based on a control signal, asserts a read clock stop signal and generates a write reset enable signal from the read clock stop signal. A plurality of first-in, first-out (FIFO) buffers coupled to the master logic circuit, include a local buffer, a local logic circuit, write pointer logic, and read pointer logic. The local buffer i) accepts write data in accordance with a write pointer and a write clock, and ii) provides data based on a read pointer and a read clock, the local buffer placed in a suspended state when the master logic circuit asserts the read clock stop signal. The local logic circuit generates i) a write pointer reset signal based on the read clock stop signal and the write reset enable signal, and ii) a read pointer reset signal based on the presence of the read clock stop signal and a predefined input value. The write pointer logic generates and updates the write pointer based on the write clock, wherein, based on a presence of the write pointer reset signal, the write pointer logic suspends movement of the write pointer. The read pointer logic generates and updates the read pointer based on the read clock, wherein, based on a presence of the read pointer reset signal, the read pointer logic suspends movement of the write pointer. When the master topic circuit asserts the read clock stop signal, each of the plurality of FIFO buffers suspends movement of each write pointer and each read pointer, and, when the master logic circuit de-asserts the read clock signal, each of the plurality of FIFO buffers enables movement of each write pointer, then the read pointer to align data write and read operations of the plurality of FIFO buffers.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 4 shows a process of alignment as might be employed by embodiments of the present invention.

DETAILED DESCRIPTION

In accordance with exemplary embodiments of the present invention, a multiple first-in, first-out buffer pointers (multi-FIFO pointers) alignment system includes synchronization circuitry to align multiple FIFO buffer operations. A FIFO read clock stoppage signal is generated by master logic that stops the read clock shared by all the transmit channels and then re-starts the read clock to align them. The FIFO read clock stoppage signal is applied to the read clock of all FIFOs which need to be aligned and, when rate change is needed, the FIFO read clock stoppage signal suspends the read clock, causing local write and read pointers to be reset. After the FIFO read clock stoppage signal is de-asserted, the read clock starts to all FIFOs concurrently, thereby aligning the channels. Embodiments of the present invention thus solve the limitation of FIFO usage in designs where multiple FIFOs need to be aligned for specific standard requirements. Synchronous stoppage and restart of FIFO read clocks is enabled since these FIFO read clocks are usually originated from a common source, such as a phase-locked loop (PLL) which produces high rate transmit clock.

Figure 1:
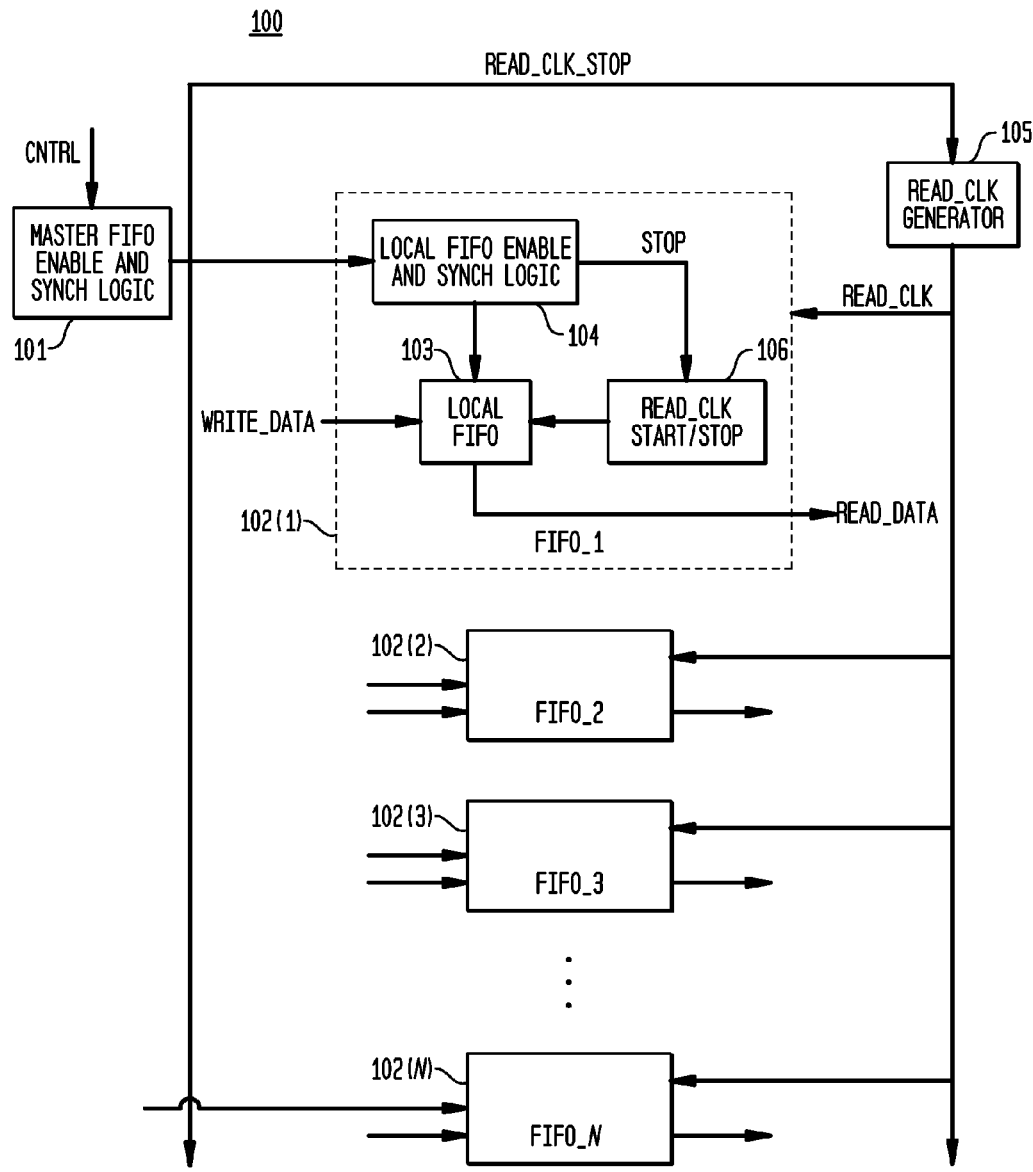
FIG. 1 shows an exemplary FIFO system having synchronization circuitry operating in accordance with exemplary embodiments of the present invention.

FIG. 1 shows art exemplary multi-FIFO pointers alignment system 100 having synchronization circuitry operating in accordance with exemplary embodiments of the present invention. Multi-FIFO pointers alignment system 100 comprises master FIFO enable and synch logic 101 and N>1 (i.e., two or more) FIFO buffers 102(1)-102(N) (shown labeled in the figures as FIFO_1, FIFO_2, . . . , FIFO_N). FIFO buffers 102(1)-102(N) each operate in an analogous manner, and so operation for each of FIFO buffers 102(1)-102(N) is described herein with respect to FIFO buffer 102(1). FIFO buffer 102(1) comprises local FIFO 103, READ_CLK Start/Stop logic 106, and local FIFO enable and synch logic 104. READ_CLK Generator 105 generates a READ_CLK signal employed by FIFO buffers 102(1)-102(N).

Local FIFO 103 receives data to be written (shown as WRITE_DATA) and provides data to be read (shown as READ_DATA) based upon write and read clocks, respectively (not shown in FIG. 1). A FIFO read clock stoppage signal READ_CLK_STOP is generated by master FIFO enable and synch logic 101 (when requested through external signal CNTRL generated by, for example, a control processor) and applied to at least one of READ_CLK Start/Stop logic 106 and READ_CLK generator 105. The FIFO read clock stoppage signal READ_CLK_STOP is generated by master FIFO enable and synch logic 101 to suspend the read clock of all local FIFOs of FIFO buffers 102(1)-102(N) which are desirably aligned, as described subsequently.

Figure 2:
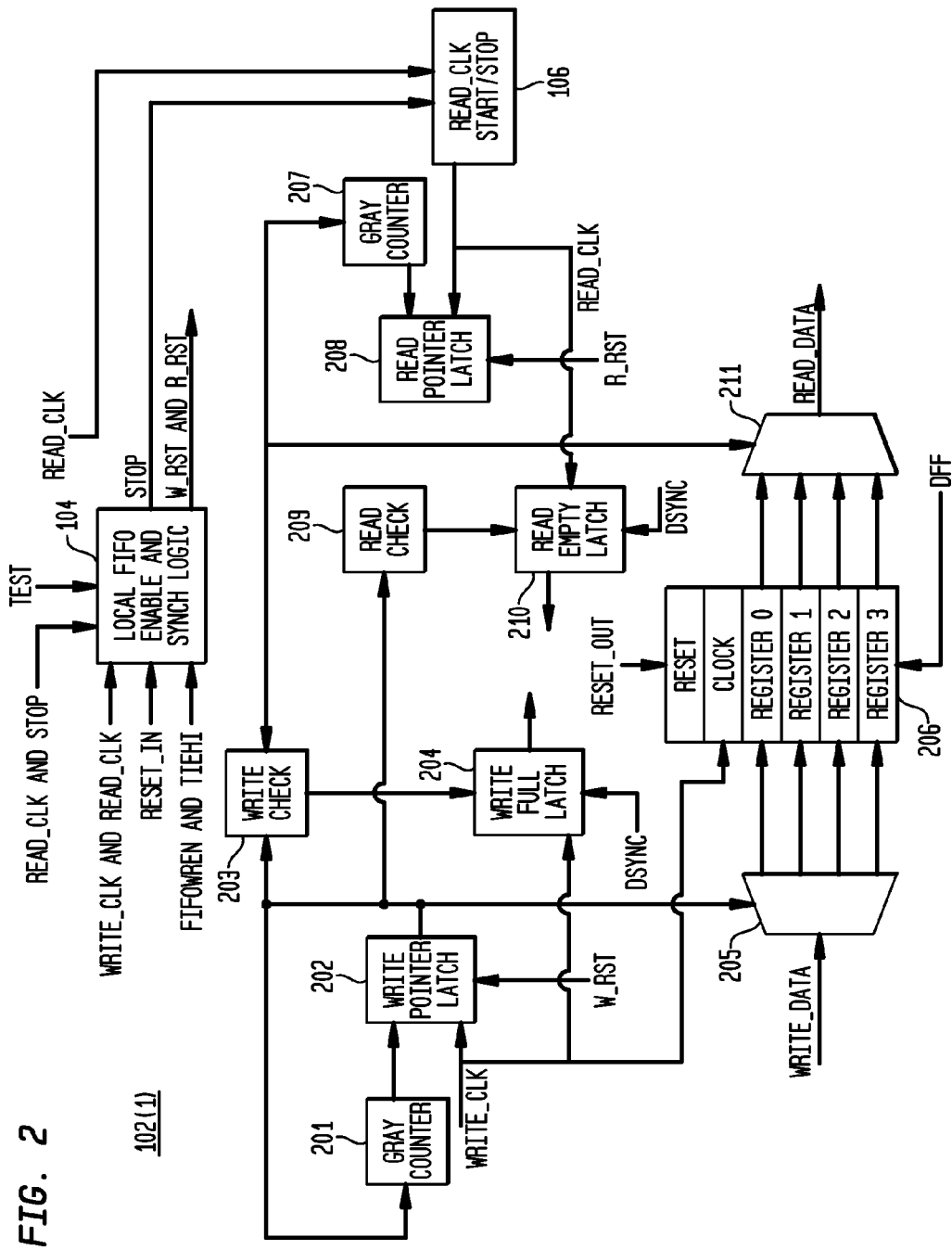
FIG. 2 shows an exemplary FIFO buffer receiving synchronization signaling as might be employed by the exemplary system of FIG. 1.

FIG. 2 shows an exemplary FIFO buffer 102(1) receiving synchronization signaling as might be employed by the exemplary system of FIG. 1. Local FIFO enable and synch logic 104 is shown receiving READ_CLK_STOP, the write and read clocks WRITE_CLK and READ_CLK, respectively, an input RESET_IN and FIFOWREN (to enable write pointer reset to each local FIFO) derived from the signal READ_CLK_STOP, and TIEHI to enable read pointer reset to each local FIFO. TIEHI is a logic "high" signal that is employed to force the clock signal to logic high, thereby stopping the read clock operation that are provided from master FIFO enable and synch logic 101. Local FIFO enable and synch logic 104 is shown generating RESET_OUT (also derived from READ_CLK_STOP) to reset the local FIFO, and signal STOP employed to signal to READ_CLK Start/Stop 106 to suspend the READ_CLK signal. Note that (in FIG. 1) the READ_CLK_STOP signal might also be applied to the READ_CLK Generator 105 directly to suspend the READ_CLK signal for all buffers simultaneously. Local FIFO enable and synch logic 104 also generates local write and read pointer reset signals W_RST and R_RST generated as described subsequently with respect to FIG. 3. The input DSYNC is a synchronizer (for example, two directly connected two flops) meant to synchronize operation of the latches.

FIFO buffer 102(1) also includes local FIFO register 206 receiving write data WRITE_DATA through multiplexer (MUX) 205 (to direct data to particular storage locations in accordance with the write pointer), and providing read data READ_DATA through multiplexer (MUX) 211 (to direct data from particular storage locations in accordance with the read pointer). Local FIFO register 206 is generally timed using the write clock WRITE_CLK. During a write operation, write logic is set to enable write data operations under timing from the write clock WRITE_CLK (e.g., enable write destination based on write pointer latch 202), and read logic is set to disable read operations under timing from the read clock READ_CLK (e.g., enable output based on read pointer latch 208). MUX 205 is controlled (or directed) by a write pointer provided from write pointer latch 202. Gray counter 201 is employed to generate write pointer values, which are successively updated and stored in write pointer latch 202. Write check (module) 203 also receives the current write and read pointer values, and if all of the registers in 206 are filled with non read yet data, then the value of write full latch 204 is set, enabling an external controller (not shown) to switch to a read operation or suspend transfer of write data to FIFO register 206. When local write pointer reset signal W_RST is generated and applied to write pointer latch 202, the write pointer value is reset to its initial value.

In a similar manner, during a read operation read logic is set to enable read operations under timing from the read clock READ_CLK (e.g., enable output from read pointer latch 208). MUX 211 is controlled (or directed) by a read pointer provided from read pointer latch 208. Gray counter 207 is employed to generate read pointer values, which are successively updated and stored in read pointer latch 208. Read check (module) 209 also receives the current write and read pointer values, and if all of the registers in FIFO register 206 have been read, and no new data available for read, then the value of read empty latch 210 is set, enabling an external controller (not shown) to switch to a write operation or suspend transfer of read data from FIFO register 206. When local read pointer reset signal R_RST is generated and applied to read pointer latch 202, the read pointer value is reset to its initial value.

By controlling the write and read pointer reset signals W_RST and R_RST generated internally to all of FIFO buffers 102(1)-102(N) for alignment, alignment might be achieved by resetting all the pointers and starting all pointer movement at the same time. If the FIFO pointer resets were synchronized to the write/read clock domain, uncertainty is introduced to the pointer alignment between different FIFO registers of FIFO buffers 102(1)-102(N); however, the write clock is generally free-running and employed by the local FIFO registers. Instead of using synchronizers, in accordance with embodiments of the present invention, the read clock (READ_CLK) is stopped (or its actions suspended) to align the pointers. As employed herein, "stopping" the read clock might be implemented by sustaining the reset signal to the read pointer logic circuits. When alignment is necessary, a READ_CLK_STOP signal is generated and asserted to stop the READ_CLK by master FIFO enable and synch logic 101 (via control signal CNTRL). READ_CLK_STOP is then employed to generate the FIFO write reset enable signal FIFOWREN that is supplied to all of FIFO buffers 102(1)-102(N). READ_CLK_STOP and FIFOWREN are then employed to generate the write and read pointer reset signals W_RST and R_RST locally (i.e., at each of FIFO buffers 102(1)-102(N)), which puts all the pointers of FIFO buffers 102(1)-102(N) into a RESET state. The write clock provided through WRITE_CLK is free running, so, to start the alignment of the local FIFOs, the READ_CLK_STOP is de-asserted. When READ_CLK_STOP is de-asserted, the RESET state is removed, or "released", from the circuit logic generating the write and read pointers and, enabling the pointer reset pipeline registers. The values for the write and read pointers do not move until pointer resets are released (W_RST and R_RST are de-asserted locally) since READ_CLK is not yet running, as described subsequently with respect to FIG. 3. Once READ_CLK starts running, the FIFO write reset enable signal FIFOWREN to all of FIFO buffers 102(1)-102(N) is released, thereby enabling all the write pointers after a number of write clock cycles later. In a similar mariner, all the read pointers are enabled after a number of write clock cycles later from when the FIFOWREN is released. This latency for the read pointers is matched to allow read pointer reset to release to meet the pointer offset requirement of a particular FIFO design.

Figure 3:
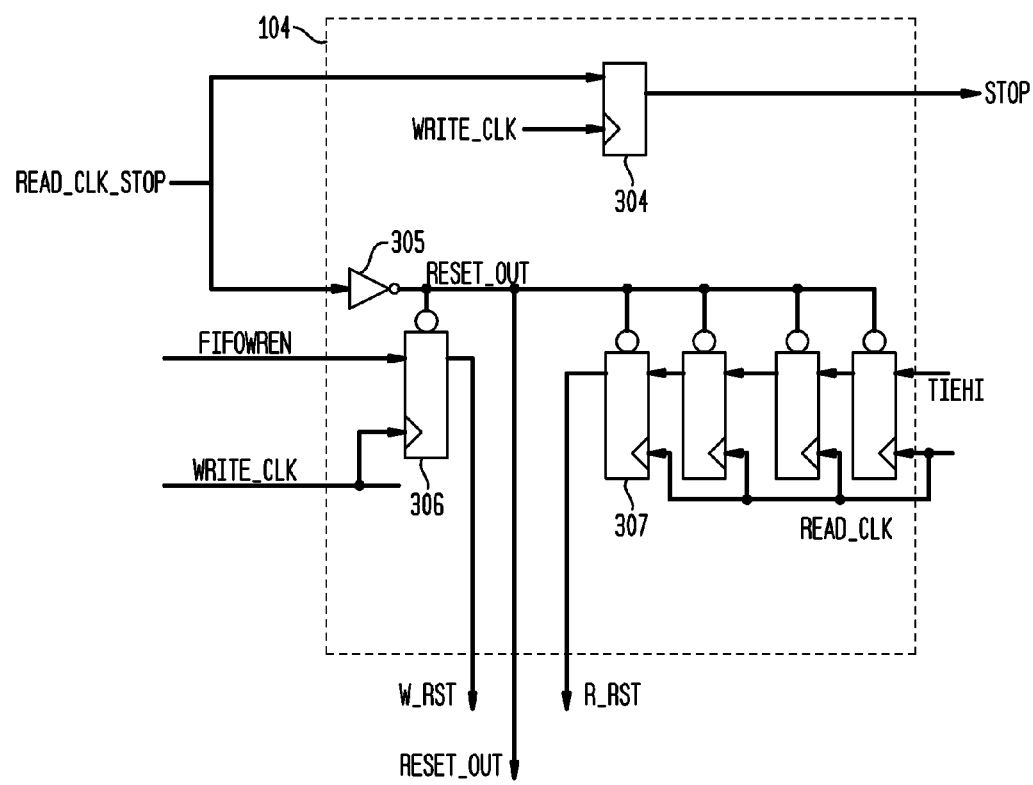
FIG. 3 shows an exemplary embodiment of the synchronization circuitry of FIG. 1.

FIG. 3 shows an exemplary embodiment of synchronization circuitry of FIG. 1 with local FIFO enable and synch logic 104 to generate STOP from READ_CLK_STOP, RESET_OUT, and local write and read enable signals W_RST and R_RST to align the local buffers of FIFO buffers 102(1)-102(N). Timing for a FIFO system is generally with respect to a reference clock (shown as READ_CLK) derived from a system clock, with others clock signals, such as the read and write clock signals, derived from this reference. As shown in FIG. 3, the alignment process begins when a rate change request, through signal CNTRL, is applied to master FIFO enable and synch logic 101, which generates the READ_CLK_STOP signal. The READ_CLK_STOP signal is directly applied to latch 305, timed by the write clock signal (WRITE_CLK) to generate the signal STOP.

TIEHI, ultimately employed to generate the read pointer reset signal, R_RST, by latch set 307 is applied to the first of latch set 307, timed by the READ_CLK signal. As shown in FIG. 3, for the exemplary implementation, latch 306, and latch set 307 are optionally enabled through an inverted signal, through inverter 305. Such use of inverted signals might be through design choice, and might be employed for adding delay to match timing of signals or to avoid adverse effects of noise. When READ_CLK_STOP is asserted, the signal RESET_OUT is generated to reset the FIFO buffer, reset latch 306, and reset latch set 307.

The input of latch 306 is FIFOWREN, which is clocked using the write clock (WRITE_CLK). Once latch 306 is reset (by READ_CLK_STOP being asserted then de-asserted), latch 306 provides the FIFOWREN, upon the next write clock cycle as W_RST, which then resets the write pointer logic. TIEHI is applied to latch set 307 (also enabled by READ_CLK_STOP being asserted then de-asserted) which, after four read clock cycles, provides the read pointer reset signal, R_RST that then resets the read pointer logic.

When the signal READ_CLK_STOP is de-asserted, the signal STOP is de-asserted, allowing the READ_CLK signal to be aligned, and the RESET_OUT signal is de-asserted, allowing for FIFO operation. In addition, latch 306, and latch set 307 are reset, de-asserting, the W_RST and R_RST reset signals.

FIG. 4 shows a process of alignment 400 as might be employed by embodiments of the present invention. When alignment is necessary, at step 402, READ_CLK_STOP and FIFOWREN signals are generated (by, e.g., master FIFO enable and synch logic 101 via control signal CNTRL) and asserted to generate the signal STOP to stop the READ_CLK. At step 404, the local write and read pointer reset signals W_RST and R_RST are generated from READ_CLK_STOP and FIFOWREN, and, at step 406, all the pointers (e.g., of FIFO buffers 102(1)-102(N)) are placed into a RESET state. At step 408, the READ_CLK_STOP is de-asserted to start the alignment of the local FIFOs. When READ_CLK_STOP is de-asserted, the RESET state is removed, or "released", from the logic generating the write and read pointers of all of FIFO buffers 102(1)-102(N), thereby enabling the pointer reset pipeline registers. However, as described above, the values for the write and read pointers do not move until pointer resets are released (W_RST and R_RST are de-asserted locally) since READ_CLK is not yet running. At step 410, the READ_CLK starts running, and, at step 412, FIFOWREN to all of FIFO buffers 102(1)-102(N)) is released, thereby enabling all the write pointers after a number of write clock cycles later. At step 414, all the read pointers are enabled after a number of write clock cycles later. As described above, latency is matched for the read pointers to allow read pointer reset release to meet the pointer offset requirement of a particular FIFO design.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. Apparatus for aligning data write and read operations between different buffers, the apparatus comprising:
   a master logic circuit configured to, based on a control signal, assert a read clock stop signal and generate a write reset enable signal from the read clock stop signal;
   a plurality of first-in, first-out (FIFO) buffers coupled to the master logic circuit, wherein each of the plurality of FIFO buffers comprises:
      a local buffer configured to i) accept write data in accordance with a write pointer and a write clock, and ii) provide data based on a read pointer and a read clock, the local buffer placed in a suspended state when the master logic circuit asserts the read clock stop signal,
      a local logic circuit configured to generate i) a write pointer reset signal based on the read clock stop signal and the write reset enable signal, and ii) a read pointer reset signal based on the presence of the read clock stop signal and a predefined input value,
      write pointer logic configured to generate and update the write pointer based on the write clock, wherein, based on a presence of the write pointer reset signal, the write pointer logic suspends movement of the write pointer, and
      read pointer logic configured to generate and update the read pointer based on the read clock, wherein, based on a presence of the read pointer reset signal, the read pointer logic suspends movement of the write pointer;
   wherein, when the master logic circuit asserts the read clock stop signal, each of the plurality of FIFO buffers suspends movement of each write pointer and each read pointer, and, when the master logic circuit de-asserts the read clock signal, each of the plurality of FIFO buffers enables movement of each write pointer, then the read pointer to align data write and read operations of the plurality of FIFO buffers.

2. The apparatus of claim 1, wherein when the master logic circuit de-asserts the read clock signal, each of the plurality of FIFO buffers enables movement of each read pointer with a predetermined delay from enablement of the write pointer.

3. The apparatus of claim 1, wherein the master logic circuit comprises a first latch module timed with the read clock and a second latch module timed with the write clock, each of the first and the second latch modules enabled based on the read clock stop signal, wherein:
   the first latch module is configured to latch a predefined value based on the a predefined number of cycles of the read clock and provide the predefined value to the second latch module; and
   the second latch module is configured to latch the output value of the first latch module based on a predefined number of cycles of the write clock and provide the write reset signal.

4. The apparatus of claim 1, wherein, when the master logic circuit asserts the read clock stop signal, operation of the read clock is suspended, while operation of the write clock is free running.

5. The apparatus of claim 1, wherein the local logic circuit comprises a latch configured to generate the write pointer reset signal as the write reset enable signal after a predetermined number of cycles of the write clock, and a read pointer reset signal based on the read clock stop signal.

6. The apparatus of claim 1, wherein the local logic circuit comprises a plurality of latches configured to generate the read pointer reset signal after a predetermined number of cycles of the read clock.

7. The apparatus of claim 1, wherein the apparatus is embodied in a Serializer-Deserializer (SerDes) device.

8. A method of aligning data write and read operations of a plurality of first-in, first-out (FIFO) buffers, the method comprising:
   asserting, by a master logic circuit based on a control signal, a read clock stop signal and generating a write reset enable signal from the read clock stop signal;
   accepting, by a local buffer, write data in accordance with a write pointer and a write clock, and providing data based on a read pointer and a read clock, the local buffer placed in a suspended state when the master logic circuit asserts the read clock stop signal,
   generating, by a local logic circuit, i) a write pointer reset signal based on the read clock stop signal and the write reset enable signal, and ii) a read pointer reset signal based on the presence of the read clock stop signal and a predefined input value,
   generating and updating, by write pointer logic, the write pointer based on the write clock, and suspending, based on a presence of the write pointer reset signal, movement of the write pointer, and
   generating and updating, by read pointer logic, the read pointer based on the read clock, and suspending, based on a presence of the read pointer reset signal, movement of the write pointer;
   wherein, when the asserting of the read clock stop signal, each of the plurality of FIFO buffers suspends movement of each write pointer and each read pointer, and, when de-asserting the read clock signal, each of the plurality of FIFO buffers enables movement of each write pointer, then the read pointer, aligning data write and read operations of the plurality of FIFO buffers.

9. The method of claim 8, comprising, when the de-asserting of the read clock signal by the master logic circuit, enabling by each of the plurality of FIFO buffers movement of each read pointer with a predetermined delay from enablement of the write pointer.

10. The method of claim 8, comprising, when the asserting of the read clock stop signal by the master logic circuit, suspending operation of the read clock while operation of the write clock is free running.

11. The method of claim 8, comprising generating, with a latch of the local logic circuit, i) the write pointer reset signal as the write reset enable signal after a predetermined number of cycles of the write clock, and ii) a read pointer reset signal based on the read clock stop signal.

12. The method of claim 8, comprising generating, by a plurality of latches of the local logic circuit, the read pointer reset signal after a predetermined number of cycles of the read clock.

13. The method of claim 8, wherein the method is embodied as steps of a processor of a Serializer-Deserializer (SerDes) device.

14. A non-transitory machine-readable storage medium, having encoded thereon program code, wherein, when the program code is executed by a machine, the machine implements a method for aligning data write and read operations of a plurality of first-in, first-out (FIFO) buffers, comprising the steps of:

asserting, based on a control signal, a read clock stop signal and generating a write reset enable signal from the read clock stop signal;

accepting, by a local buffer, write data in accordance with a write pointer and a write clock, and providing data based on a read pointer and a read clock, the local buffer placed in a suspended state when the master logic circuit asserts the read clock stop signal, generating, by a local logic circuit, i) a write pointer reset signal based on the read clock stop signal and the write reset enable signal, and ii) a read pointer reset signal based on the presence of the read clock stop signal and a predefined input value, generating and updating, by write pointer logic, the write pointer based on the write clock, and suspending, based on a presence of the write pointer reset signal, movement of the write pointer, and generating and updating, by read pointer logic, the read pointer based on the read clock, and suspending, based on a presence of the read pointer reset signal, movement of the write pointer;

wherein, when the asserting of the read clock stop signal, each of the plurality of FIFO buffers suspends movement of each write pointer and each read pointer, and, when de-asserting the read clock signal, each of the plurality of FIFO buffers enables movement of each write pointer, then the read pointer, aligning data write and read operations of the plurality of FIFO buffers.

* * * * *